United States Patent
Boka

(10) Patent No.: US 7,411,543 B1
(45) Date of Patent: Aug. 12, 2008

(54) MAXIMUM-LIKELIHOOD ROCKET IDENTIFIER

(75) Inventor: Jeffrey B. Boka, Lumberton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 367 days.

(21) Appl. No.: 10/918,147

(22) Filed: Aug. 13, 2004

(51) Int. Cl.
*G01S 13/72* (2006.01)
(52) U.S. Cl. .................. 342/90; 342/95; 342/96; 342/97; 342/101; 342/195; 89/1.11
(58) Field of Classification Search ............ 89/1.11; 342/90, 95–101, 106–108, 115, 159–162, 342/192, 194–196
See application file for complete search history.

(56) References Cited

U.S. PATENT DOCUMENTS

| | | | | |
|---|---|---|---|---|
| 5,631,653 A | * | 5/1997 | Reedy | ............... 342/62 |
| 5,798,942 A | * | 8/1998 | Danchick et al. | ........... 342/96 |
| 5,960,097 A | * | 9/1999 | Pfeiffer et al. | ............ 382/103 |
| 6,262,680 B1 | * | 7/2001 | Muto | .................. 342/74 |
| 6,278,401 B1 | * | 8/2001 | Wigren | ................. 342/195 |
| 6,564,146 B1 | * | 5/2003 | Meyer et al. | ........... 701/213 |
| 6,714,155 B1 | * | 3/2004 | Rose | ................... 342/107 |
| 6,825,792 B1 | * | 11/2004 | Letovsky | .............. 342/14 |
| 2004/0056792 A1 | * | 3/2004 | Miron | ................. 342/52 |

\* cited by examiner

*Primary Examiner*—Troy Chambers
(74) *Attorney, Agent, or Firm*—Duane Morris, LLP

(57) ABSTRACT

A sensor suite determines location and velocity information relating to a missile threat, which is converted to missile or rocket state estimates. The state estimates are transformed into time-invariant dynamic parameters, unique for each missile type. Estimated rocket dynamic parameters are computed for each target type being considered, and compared with a reference set of rocket parameters representing different target types. The estimated rocket parameters are compared with the reference parameters in a maximum-likelihood sense, and combined using fuzzy logic to identify the rocket type and the likelihood. The identified rocket type and likelihood is used to aid in determining the future location of the missile so countermeasure can be applied.

5 Claims, 2 Drawing Sheets

MAXIMUM-LIKELIHOOD ROCKET IDENTIFIER

FIELD OF THE INVENTION

This invention relates to prediction of the future location of a missile such as a ballistic missile, and more particularly to methods for missile property identification.

BACKGROUND OF THE INVENTION

Defense against missile attack has been important for centuries. In the distant past, fortified structures were used to protect against missiles such as projectiles from ballistas, arbalests, and trebuchets. With the advent of projectile-firing cannon, fortified structures became less useful, and the inadequacy of fortifications was exacerbated by the introduction of bomb-carrying aircraft.

More recently, rocket-propelled missiles have become very important, because of their ability to quickly transport extremely destructive payloads to distant locations. The payloads that are now of importance include nuclear, chemical, and biological weapons, known generally as weapons of mass destruction (WMD). These payloads when carried by rocket-propelled missiles are potentially so destructive that a great deal of attention has been directed toward attempts to neutralize the threat. These steps included socio-political solutions such as mutually-assured destruction (MAD). However, the dissolution of a major player, namely the Union of Soviet Socialist Republics (USSR) has reduced the potential efficacy of MAD and allowed the potential or actual proliferation of weapons of mass destruction to small or unstable states and other entities which are not necessarily friendly to the United States.

As a response to the perceived threat to the Unites States of ballistic missiles launched from distant locations and carrying WMD, programs have been instituted to investigate and produce ballistic missile defense systems. Ballistic missiles have an extremely limited time between launch and impact, so defense systems must very quickly identify and destroy the threat.

The ballistic missile goes through several distinct phases during its operation. The first phase is launch, in which a rocket engine lifts the missile and propels it upward. The missile is very vulnerable at this stage, but there are substantial difficulties in identifying it at this stage, as the launch is liable to be in a hostile territory. While the launch may produce a heat (infrared) and light signature that would be identifiable if viewable, there may not be a line-of-sight between sensors and the missile launch that might identify the situation. Spacecraft may be able to view the region, but the communications between the spacecraft and defense systems have not in the past given long warning times of missile launch.

Following launch, the rocket-propelled missile passes through a boost stage, in which the rocket engine propels the missile through a principal portion of the atmosphere. This phase also produces a heat signature. Since the missile is at a significant altitude in this phase, it may be observable by ground-based infrared sensors. The missile may also be observable on ground-based radar systems. Thus, a missile may be identifiable when in the boost phase. At some time, the rocket engine stops operating, so boost thrust goes to zero. Following the termination of thrust, the missile enters a mid-course phase, in which the missile proceeds along a ballistic trajectory, carried by its own inertia.

The missile in its ballistic mode proceeds toward its target. In the mid-course phase, the heat signature is much reduced, but the missile may be clearly viewed by radar. At some point, as the missile approaches its target, it begins to re-enter dense portions of the atmosphere, at which time a further heat signature may be radiated. This re-entry may be at a location essentially above the target. Destruction of the missile during the re-entry phase may still result in damage to the target, since the payload weapon may still be effective and active. Despite the missile being damaged and kept from properly functioning, the constituent parts may still be very harmful to the target region. It is very desirable to identify and destroy missiles very early in flight. There are several reasons for this, 1) to allow time for repeated tries at destruction, and 2) so that the destroyed missile falls short of its target, preferably in the hostile territory.

The destruction of a missile in flight requires the ability to predict the future location of the missile, so that a kill vehicle or laser beam countermeasure can be guided toward the actual location of the target at the time of the arrival of the countermeasure. In the past, kinematic boost phase target identification relied on trajectory template matching techniques. Development of the trajectory templates required the development of large databases of target specific templates relating to the target's temporal kinematic properties such as altitude, velocity, and flight path angle. The efficacy of the trajectory template matching technique depended on having an accurate estimate of time after lift-off (TALO) so that a good estimate of the time index into the templates could be established. The efficacy also depended upon the target having a specific energy trajectory, such as "minimum energy," "lofted," or "depressed." A minimum energy trajectory puts the missile on the target with expenditure of minimum propellant energy. Selection of elevated or depressed launch angles can result in lofted or depressed trajectories. The missile's trajectory should be readily identifiable, so that the temporal templates relevant to one target do not conflict or "smear" with the templates of other targets. When the target deviates from the expected trajectory and/or is lofted or depressed, or when the target time after lift-off (TALO) is not accurately known, the trajectory template methods tend to break down, and do not always produce reliable results.

Improved or alternative target future location estimation methods and/or apparatus are desired.

SUMMARY OF THE INVENTION

A method for estimating at least one of the type and future location of a missile based on information relating to its sensed present position and velocity comprises the steps of estimating from the sensed data a set of estimated missile parameters including at least one of mass flow rate, thrust, specific impulse, gravity-free burn-out velocity, burn-out-time (time to burn-out of the current stage), and mass at burn-out. The set of estimated parameters is compared with a predetermined database corresponding to at least one of nominal mass flow rate, thrust, specific impulse, gravity-free burn-out velocity, burn-out-time, and mass at burn-out parameters for known missiles, to select the best match to the set of estimated parameters. Parameter reference information sets relating to the mass flow rate, thrust, specific impulse, gravity-free burn-out velocity, burn-out-time, and mass at burn-out parameters of that missile which is the best match are accessed. Using kinematic modeling, the sensed position and velocity, and the parameter reference information set of the best match, the future location of the missile is determined.

In a particularly advantageous mode of the method according to this aspect of the invention, the step of estimating from the sensed data a set of estimated parameters includes the steps of receiving estimated rocket filter states from a boost phase filter and receiving from a store classification and parameter reference sets including dynamic and kinematic parameters relating to each stage of each target hypothesis. The gravity-free burn-out velocity and the time-to-burnout for each hypothesis are computed by iteration from the estimated rocket filter states. The estimated rocket filter states and the classification and parameter reference sets are computed for each target hypothesis from the estimated mass flow rate and the thrust level.

In another particularly advantageous mode of the method according to this aspect of the invention, the step of comparing the set of estimated parameters with a database includes the steps of receiving information including matched filter state data for each target hypothesis and computing the maximum likelihood for each hypothesis using correspondence of mass flow rate and nominal vacuum thrust with the corresponding parameters for each hypothesis. The maximum likelihood for each hypothesis is normalized and weighted, and the correct rocket is selected as that one having the maximum weighted maximum likelihood.

A method for estimating the future location of a missile based on information relating to its sensed present position and velocity according to another aspect of the invention comprises the steps of generating a database of at least two of nominal mass flow rate, thrust, specific impulse, gravity-free burn-out velocity, burn-out-time, and mass at burn-out parameters for known missiles, and estimating from the sensed data a set of estimated parameters including at least the two of mass flow rate, thrust, specific impulse, gravity-free burn-out velocity, burn-out-time, and mass at burn-out. The set of estimated parameters is compared with the database of at least two of nominal mass flow rate, thrust, specific impulse, gravity-free burn-out velocity, burn-out-time, and mass at burn-out parameters for known missiles, to select the best match to the set of estimated parameters. Parameter reference information sets relating to the mass flow rate, thrust, specific impulse, gravity-free burn-out velocity, burn-out-time, and mass at burn-out parameters are accessed of that missile which is the best match, and using the sensed position and velocity, and the parameter reference information set of the best match, the future location of the missile is determined. Countermeasures to the missile may be taken.

DESCRIPTION OF THE INVENTION

Figure 1:
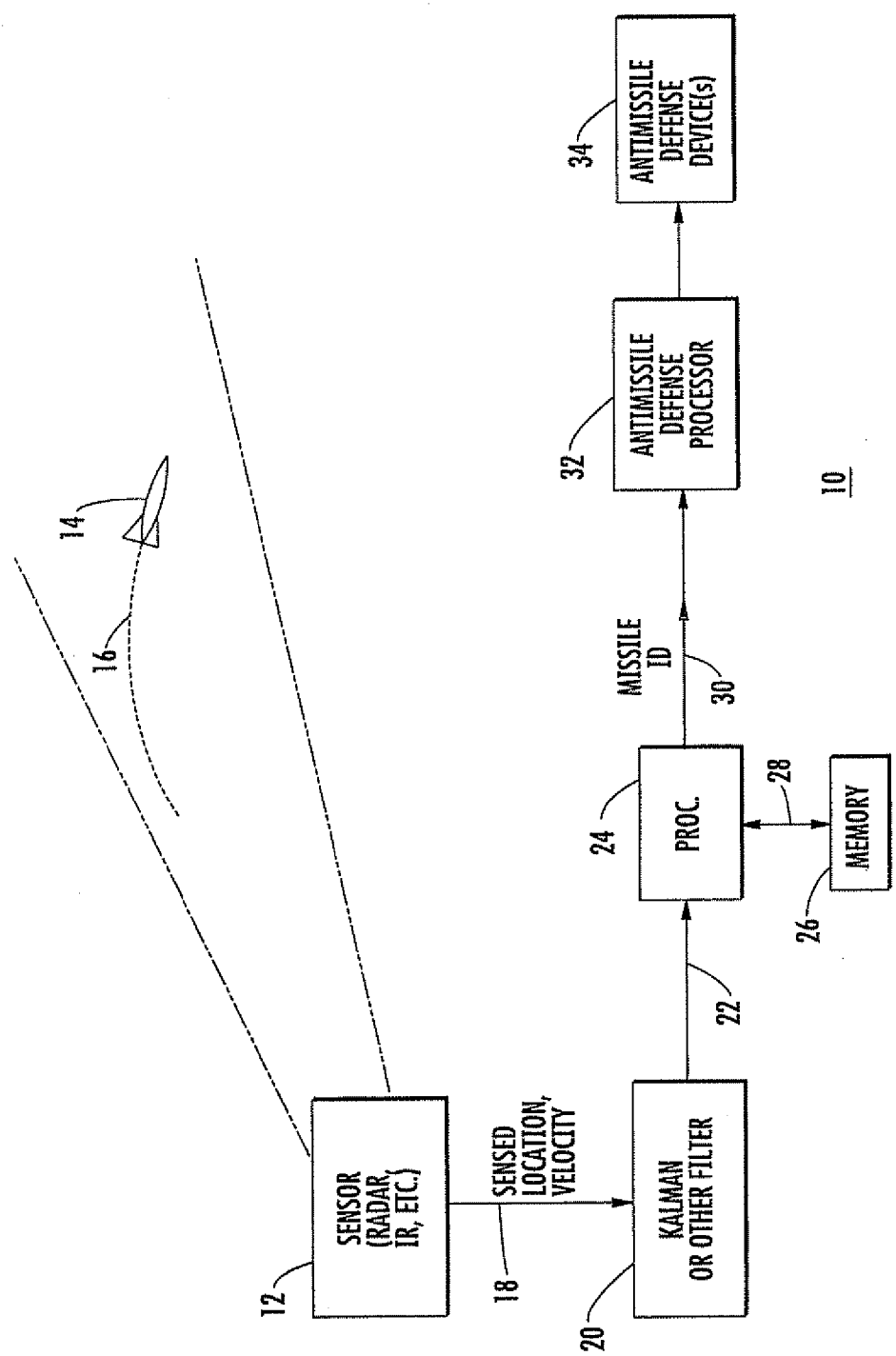
FIG. 1 is a simplified block diagram of a system according to an aspect of the invention for sensing the present location and velocity of a missile, and for using the sensed information to determine the missile type, and for accessing a database of missile properties for aiding in countermeasures.

In FIG. 1, a system 10 includes a sensor system 12 for receiving information relating to the present location and velocity of a missile 14. Sensor system 12 may include a radar or lidar (light-based ranging system), or an infrared imaging system, or any other system which generates the desired information. Sensor system 12 produces signals on a path, designated 18, which signals representing the direction and range of the target missile 14, which amounts to its present location. Since the sensing is ongoing, the information on path 18 also represents the missile track 16. The sensed information on path 18 also represents the missile's velocity, which may be derived by the use of Doppler signal processing, the historic track 16, or by any other appropriate methods.

The position and velocity information from sensor 12 is coupled by way of path 18 to a processor filter, such as a Kalman filter, illustrated as a block 20, which converts the position and velocity data to states s and covariances P. The states and covariances are applied from filter 20 by way of a path 22 to a processor 24, which performs certain processing in conjunction with a memory or database illustrated as a block 26 to determine the missile type, the missile parameters, and the future location. The future location information is coupled by way of a path 30 to a block 32, which represents a countermeasures control processor or computer for controlling an antimissile device or devices, illustrated as a block 34. The antimissile devices may be on-orbit brilliant pebbles, ground-based interceptor missiles, an antimissile laser, or any other appropriate antimissile system.

According to an aspect of the invention, a "Maximum-likelihood Rocket Identifier" (MRI) system involves a physics-based approach for boost phase target identification. The target identification according to this aspect of the invention employs an algorithm that avoids at least some of the temporal dependencies of the template methods. Whereas template methods attempt to temporally align target state estimates with a priori generated kinematic target templates, MRI transforms state estimates into time-invariant rocket dynamic or dynamical parameters, which are unique for each rocket type. The method includes computing or estimating rocket exoatmospheric dynamical parameters for each target classification reference set that contains the target reference parameters for each target class being considered (hypothesized). Examples of target classes include single, dual, and three stage rockets. The estimated rocket dynamical parameters and states are compared with a reference set of rocket parameters in a maximum likelihood sense and combined or rationalized to identify the rocket type and the likelihood. The combining or rationalizing may be performed using fuzzy logic.

Figure 2:
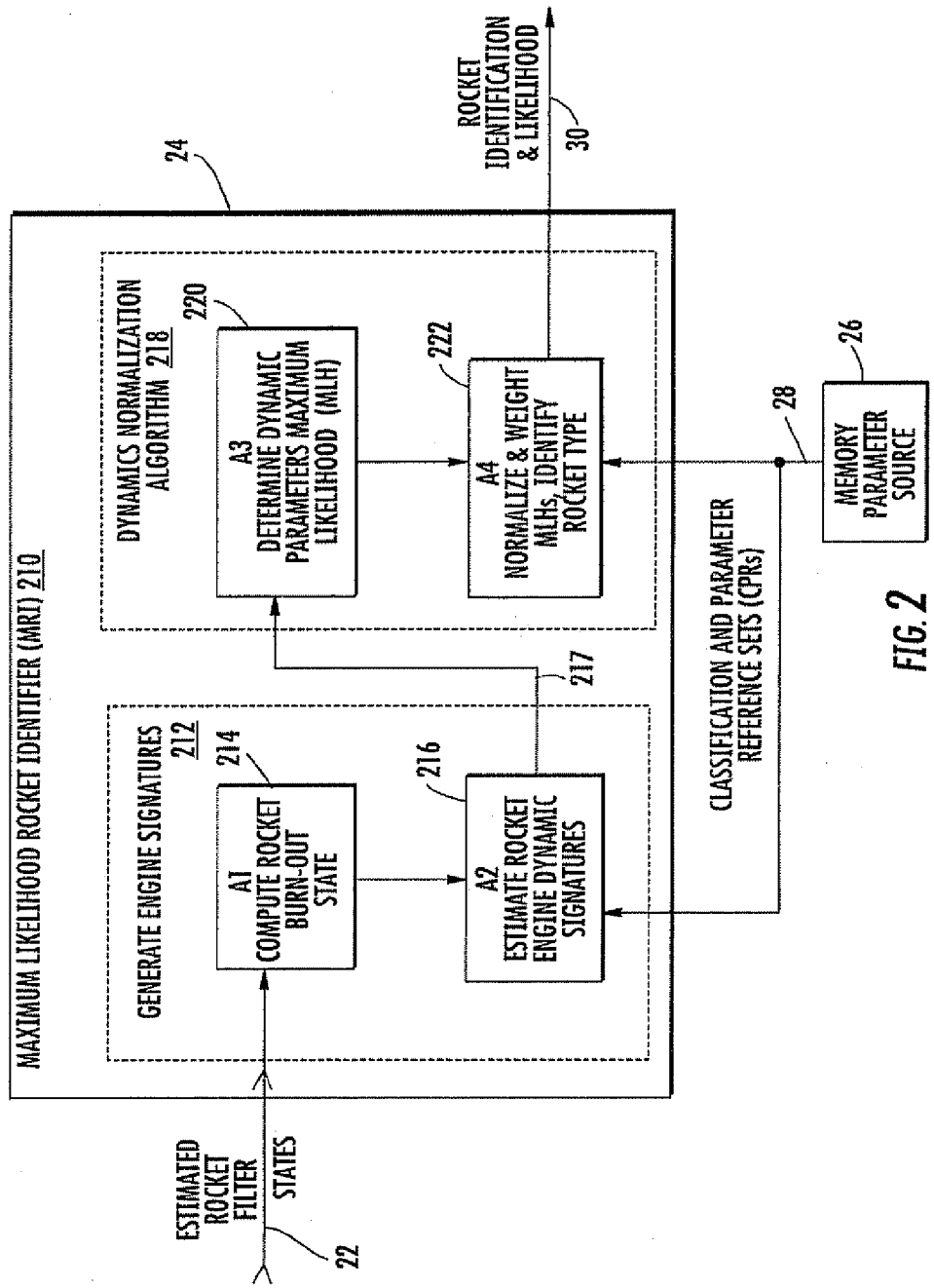
FIG. 2 is a functional block diagram of processing which is performed in a processor of FIG. 1.

FIG. 2 is a simplified functional block diagram of a portion of the processing performed in processor block 24 of FIG. 1. In FIG. 2, the estimated rocket filter states arrive by way of path 22 at Maximum Likelihood Rocket Identifier (MRI) 210 of FIG. 2, and are applied to a Compute Rocket Burn-Out State portion 214 of a Generate Engine Signatures (GENES) block 212. GENES block 212 also receives classification and parameter reference sets (CPRs) over path 28 from memory 26. The CPRs include various parameters, such as nominal mass flow rate, nominal thrust, nominal specific impulse, nominal gravity-free burn-out velocity, nominal burn time, nominal initial mass and nominal mass at burn-out for each rocket type in a database in memory 26. A priori, there is no basis for selecting as the rocket type any one of the rockets whose parameters are stored in the database of memory 26. In order to make this determination, GENES 212 requires unbiased rocket filter state estimates including, but not limited to, position, velocity, acceleration, and specific mass flow rate and associated filter covariance. The target rocket states are first used to estimate the gravity-free burn-out velocity and the burn-out time of the current stage of the target (algorithm A1) for each hypothesis defined within the target classification reference set. Next GENES 212 determines the time-invariant dynamical rocket equation parameters relating to each hypothesis (algorithm A2) that includes, but is not limited to estimated mass flow rate, estimated thrust, estimated specific impulse, estimated gravity-free burn-out velocity, estimated burn-out time, estimated mass at burn-out, and time dependent dynamical rocket equation parameters such as current mass.

The computed rocket equation parameters and states (CREPES) produced by GENES block 212 of FIG. 2 are coupled by way of a logic path 217 to a Dynamics Normalization Algorithm (DNA) 218. Within DNA 218, a Determination of Dynamic Parameter Maximum Likelihood algorithm (A3) 220 receives the CREPES and computes (algorithm A3) the maximum likelihood (MLH) of each parameter for each hypothesis defined within the target classification reference set. Note that the MLH for each parameter may be with respect to the nominal CRPs parameters from memory 22 or from an auxiliary parameter source (not illustrated) that provides off-nominal parameter estimates such as hot and cold motor variations. The resulting MLH rocket parameters are applied to a fuzzy logic algorithm (A4) illustrated as a block 222. Block 222 combines all likelihoods and performs rocket identification. To this end, the MLHs of each parameter are first normalized for each target hypothesis. The normalized MLHs for each hypothesis are then combined across the parameter space using selectable parameter weightings, resulting in the MLH of each hypothesis and the target identification. The MLH and the target identification are coupled from MRI block 210 of FIG. 2 by way of path 30.

Various definitions, nomenclature, and units of measure used in the description of the processing include $\dot{m}$: Mass flow rate (kg/sec)
m: Mass of target (kg)
$V_e$: Exit velocity (m/sec)
$p_e$: Exit pressure (N/m^2)
$p_o$: Free stream pressure (N/m^2)
$A_e$: Nozzle exit area (m^2)
$g_c$: Earth standard gravity constant (m/sec^2)
$I_{sp}$: Vacuum specific impulse (sec)

$$\left( = \frac{1}{g_c} \left[ V_e + p_e \frac{A_e}{\dot{m}} \right] \right)$$

$\hat{X}$: Target body axis unit vector, ECEF
$\underline{F}_P$: Pressure dependent thrust correction (N), ECEF ($=p_o A_e \hat{X}$)
$\rho$: Altitude dependent atmospheric density (kg/m^3)
$S_{ref}$: Reference area (m^2)
$C_D$: Coefficient of drag
$\underline{F}_D$: Axial Drag Force (N), ECEF $$\left( = \frac{1}{2} \rho |\dot{\underline{Z}}|^2 S_{ref} C_D \right)$$

$\underline{\omega}$: Earth angular rate vector (rad/sec)
$\mu$: Gravitational constant G*Mearth (m^3/s^2)
$\underline{Z}$: Target position vector (m), ECEF
$\dot{\underline{Z}}$: Target velocity vector (m/sec), ECEF
$\ddot{\underline{Z}}$: Target acceleration vector (m/sec^2), ECEF
$\underline{b}$: Specific mass flow rate vector $$(1/\text{sec})\left( = \frac{\dot{m}}{m} \hat{X} \right)$$

$\underline{A}$: Target thrust acceleration vector (m/sec^2), ECEF ($=I_{sp} g_c \underline{b}$)

and the underscores (_) represent vector quantities, the hats imply unit vectors, and ECEF refers to Earth-Centered-Earth-Fixed coordinates.

Assumptions that underlie the analysis are that the target rocket obeys the rocket equation, the mass flow rate ($\dot{m}$) in the rocket engine is constant, and the specific impulse ($I_{sp}$) is constant. In addition, it is assumed that pressure correction and drag force terms are small and deterministic, and that they can be accounted for in filter state equations using state noise, or can be compensated for using deterministic equations. As an alternative, pressure correction and drag terms may be ignored because the parameter estimations are performed at times at which the missile is exoatmospheric.

The kinematic or rocket equations which describe the motion of the target missile and the mass flow rate of its engine are given by $$\ddot{\underline{Z}} = \frac{-\mu \underline{Z}}{|\underline{Z}|^3} + \underline{A} - \frac{\underline{F}_D}{m} - \frac{\underline{F}_P}{m} - \underline{\omega} \times (\underline{\omega} \times \underline{Z}) - 2\underline{\omega} \times \dot{\underline{Z}} \qquad (1)$$

and $$\underline{\dot{b}}(t) = |\underline{\dot{b}}(t)| \underline{b}(t) \qquad (2)$$

respectively. These equations represent the kinematic differential equations that may be integrated using a non-linear numerical integration algorithm to predict the future position of the missile. The accuracy of the prediction process is of course contingent on knowing the proper dynamical parameters and staging events.

As mentioned, an algorithm according to an aspect of the invention is defined by two primary functions (GENES 212 and DNA 218) partitioned into 4 basic algorithms, denoted by A1, A2, A3, and A4 in. FIG. 2.

GENES 212 of FIG. 2 receives estimated rocket filter states and covariance from a boost phase filter such as 20 of FIG. 1. The filter states s and covariance P include (but are not limited to):

$$\underline{s} = \begin{Bmatrix} \underline{Z} \\ \dot{\underline{Z}} \\ |\underline{A}| \\ \underline{b} \end{Bmatrix}, \quad P = \begin{bmatrix} P_{ZZ} \\ P_{\dot{Z}\dot{Z}} \\ P_{AA} \\ P_{bb} \end{bmatrix} \qquad (3, 4)$$

where:
$P_{ZZ}$=3×3 position covariance matrix;
$P_{\dot{Z}\dot{Z}}$=3×3 velocity covariance matrix;
$P_{AA}$=thrust acceleration covariance; and
$P_{bb}$=3×3 specific mass flow rate covariance matrix.

GENES 212 also receives inputs from memory 26 in the form of Classification and Parameter Reference sets (CPRs) that include the dynamical and kinematical parameters relating to each state of each target hypothesis j:

| | |
|---|---|
| $V_{bo}^j$ | Burn-out velocity (m/sec) |
| $I_{sp}^j$ | Vacuum specific impulse (sec) |
| $c^j(T_{bo}^j)$ | Burnout velocity correction $N^{th}$-order polynomial as a function of $T_{bo}^j$ |

-continued

| $M_{bo}^j$ | Burn-out mass (kg) |
| $\overline{\dot{M}^j}$ | Nominal mass flow rate (kg) |
| $\overline{\tau^j}$ | Nominal vacuum thrust (N) |

Compute Rocket Burn-Out State algorithm 214 (A1) of FIG. 2 determines the gravity-free burn-out velocity $V_{gfbo}^j$ and the time-to-burnout $T_{bo}^j$ using estimated rocket filter states for each hypothesis j, by assuming a time $T_{bo}^j$ to burn-out, and by iterating on equations (5) and (6) until convergence for each or rocket hypothesis.

$$V_{gfbo}^j = V_{bo}^j + \hat{Z} \cdot \hat{Z} g_c c^j(T_{bo}^j) \tag{5}$$

$$T_{bo}^j = \frac{1}{|b|}\left(1 - e^{-(V_{gfbo}^j - |\hat{Z}|)/(I_{sp}^j g_c)}\right) \tag{6}$$

These equations relate to the speed and time at rocket burn-out assuming no gravity, as is ordinarily the case when applying the general rocket equation.

The gravity-free burn-out velocity $V_{gfbo}^j$ and the time-to-burnout $T_{bo}^j$ for each hypothesis j is coupled from Compute Rocket Burn-Out State algorithm 214 (A1) of FIG. 2 to Estimate Rocket Engine Dynamic Signatures algorithm 216 (A2). Algorithm A2 determines the estimated mass flow rate $\dot{M}^j$ and thrust level $\tau^j$ using estimated rocket filter states and CPRs for each hypothesis j according to $$\dot{M}^j = M_{bo}^j |b|\left(e^{(V_{gfbo}^j - |\hat{Z}|)/(I_{sp}^j g_c)}\right) \tag{7}$$

$$\tau^j = M_{bo}^j |A(t)|\left(e^{(V_{gfbo}^j - |\hat{Z}|)/(I_{sp}^j g_c)}\right) \tag{8}$$

These equations are derived from integrating the basic rocket equation while imposing assumed rocket parameters corresponding to the hypothesis j. Equations 5-8 represent an embodiment of this invention and represent a unique method for estimating the key dynamical rocket parameters that also includes but not limited to specific impulse and initial mass.

The rocket engine parameters and estimated states (CREPES) for each hypothesis are sent from A2 block 216 of FIG. 2 to the Dynamics Normalization Algorithm (DNA) 218 of FIG. 2, and more particularly to Dynamic Parameters Maximum Likelihood determination block 220 and its algorithm A3. DNA 218 also receives inputs from an auxiliary parameter source associated with memory 26, in the form of matched filter state data $\underline{s}_a^j$ for each target hypothesis j:

$$\underline{s}_a^j = \begin{Bmatrix} \underline{Z}_a^j \\ \underline{\dot{Z}}_a^j \\ |A_a^j| \\ \underline{b}_a^j \end{Bmatrix} \tag{9}$$

where the subscript "a" denotes that the filter state is derived from an auxiliary matched filter source. DNA 218 computes the maximum likelihood (MLH) for each of the CREPES of each hypothesis. For each generic filter hypothesis j, the MLH is computed based on $\dot{M}^j$ and $\tau^j$ matching the corresponding parameters for each hypothesis $$MLH^j(1) = \frac{1}{\sqrt{2\pi P_{\dot{M}^j}}}\left(e^{\frac{1}{2}(\dot{M}^j - \overline{\dot{M}}^j)^2/P_{\dot{M}^j}}\right) \tag{10}$$

$$MLH^j(2) = \frac{1}{\sqrt{2\pi P_\tau}}\left(e^{-\frac{1}{2}(\tau - \tau^j)^2/P_\tau}\right) \tag{11}$$

where $P_{\dot{M}}$ is the covariance of $\dot{M}$ and $P_\tau$ is the covariance of $\tau$.

In addition, MLH can be computed for the difference between the states $Z$, $\dot{Z}$, and b and the matched filter states $Z_a^j$, $\dot{Z}_a^j$, and $b_a^j$ for each hypothesis j:

$$MLH^j(3) = \frac{1}{(2\pi)^{1.5}|P_{ZZ}|^{0.5}}\left(e^{-\frac{1}{2}(Z-Z_a^j(t))P_{ZZ}^{-1}(Z(t)-Z_a^j(t))^T}\right) \tag{12}$$

$$MLH^j(4) = \frac{1}{(2\pi)^{1.5}|P_{ZZ}|^{0.5}}\left(e^{-\frac{1}{2}(Z(t)-Z_a^j(t))P_{ZZ}^{-1}(Z(t)-Z_a^j(t))^T}\right) \tag{13}$$

$$MLH^j(5) = \frac{1}{(2\pi)^{1.5}|P_{bb}|^{0.5}}\left(e^{-\frac{1}{2}(b(t)-b_a^j(t))P_{bb}^{-1}(b(t)-b_a^j(t))^T}\right) \tag{14}$$

The maximum likelihood (MLH) dynamic parameters are sent from A3 block 220 of FIG. 2 to A4 block 222 for normalization and weighting of the MLHs and for identification of the rocket type. First, the weighted maximum likelihoods (WMLH) are calculated for each generic filter hypothesis

TABLE I

|  | Hypothesis 1 | ... | Hypothesis N |
|---|---|---|---|
| Parameter 1<br>M | $MLH^1(1) * \frac{W_1}{\sigma_1}$ | ... | $MLH^N(1) * \frac{W_1}{\sigma_1}$ |
| Parameter 2<br>$\tau$ | $MLH^1(2) * \frac{W_2}{\sigma_2}$ | ... | $MLH^N(2) * \frac{W_2}{\sigma_2}$ |
| Parameter 3<br>$\underline{Z}$ | $MLH^1(3) * \frac{W_3}{\sigma_3}$ | ... | $MLH^N(3) * \frac{W_3}{\sigma_3}$ |
| Parameter 4<br>$\underline{\dot{Z}}$ | $MLH^1(4) * \frac{W_4}{\sigma_4}$ | ... | $MLH^N(4) * \frac{W_4}{\sigma_4}$ |
| Parameter 5<br>$\underline{b}$ | $MLH^1(5) * \frac{W_5}{\sigma_5}$ | ... | $MLH^N(5) * \frac{W_5}{\sigma_5}$ | where:

$$\sigma_k = \sum_{j=1}^{N} MLH^j(k)$$

is the sum of all hypothesis parameter MLH; and
$W_i$ are user selected parameter weightings where $$\sum_{i=1}^{5} W_i = 1.$$

Then the weighted maximum likelihoods are defined by $$WMLH(k) = \sum_{i=1}^{5} MLH^k(i)\frac{W_i}{\sigma_i}, k = 1...5 \qquad (15)$$

The maximum of the WMLH(k) is chosen as the correct hypothesis, thereby identifying the correct rocket type.

The rocket identification information and the associated likelihoods are coupled over path 30 of FIG. 1 to antimissile defense processor 32. Processor 32 receives the rocket identification information and the associated rocket parameters, as well as the state information, and calculates the trajectory in known manner, thereby implicitly determining the location of the missile at each moment in the future. It should be noted that equation 15 may also include WMLHs for other key dynamical rocket parameters mentioned herein (e.g. specific impulse, initial mass, etc.). In the example described by equation 15, these parameters have been arbitrarily given a weight of zero and thus the summation of Table 1 only illustrates five parameters.

The future locations of the missile are coupled to the antimissile defense device illustrated as 34 of FIG. 1, which performs conventional functions to reduce the threat posed by the missile.

MRI can be combined with existing kinematic template methods and IR intensity matching methods to provide a robust algorithm for threat identification and typing. MRI can also be used in conjunction with a tactical real-time fire control algorithm to support intercepting intercontinental ballistic missiles (ICBMs) during their boost phase.

What is claimed is:

1. A method for estimating at least one of the type and future location of a missile based on information relating to its sensed present position and velocity, said method comprising the steps of:
    estimating from said sensed data a set of estimated parameters including at least one of mass flow rate, thrust, specific impulse, gravity-free burn-out velocity, burn-out-time, and mass at burn-out;
    comparing said set of estimated parameters with a database of a predetermined set of nominal values of mass flow rate, thrust, specific impulse, gravity-free burn-out velocity, burn-out-time, and mass at burn-out parameters for known missiles, to select the best match to said set of estimated parameters;
    accessing parameter reference information sets relating to the mass flow rate, thrust, specific impulse, gravity-free burn-out velocity, burn-out-time, and mass at burn-out parameters of that missile which is the best match; and
    using kinematic modeling, said sensed position and velocity, and said parameter reference information set of said best match, determining the future location of said missile.

2. A method according to claim 1, wherein said step of estimating from said sensed data a set of estimated parameters includes the steps of:
    receiving from a boost phase filter estimated rocket filter states;
    receiving from a store classification and parameter reference sets including dynamic and kinematic parameters relating to each state of each target hypothesis;
    iteratively computing from said estimated rocket filter states the gravity-free burn-out velocity and the time-to-burnout for each hypothesis; and
    computing from said estimated rocket filter states and said classification and parameter reference sets the estimated mass flow rate and the thrust level for each target hypothesis.

3. A method according to claim 1, wherein said step of comparing said set of estimated parameters with a database includes the steps of:
    receiving information including matched filter state data for each target hypothesis;
    compute the maximum likelihood for each hypothesis using correspondence of mass flow rate and nominal vacuum thrust with the corresponding parameters for each hypothesis;
    normalizing and weighting the maximum likelihood; and
    selecting as the correct rocket that one having the maximum weighted maximum likelihood.

4. A method for estimating the future location of a missile based on information relating to its sensed present position and velocity, said method comprising the steps of:
    generating a database of at least two of nominal mass flow rate, thrust, specific impulse, gravity-free burn-out velocity, burn-out-time, and mass at burn-out parameters for known missiles;
    estimating from said sensed data a set of estimated parameters including at least said two of mass flow rate, thrust, specific impulse, gravity-free burn-out velocity, burn-out-time, and mass at burn-out;
    comparing said set of estimated parameters with said database of at least two of nominal mass flow rate, thrust, specific impulse, gravity-free burn-out velocity, burn-out-time, and mass at burn-out parameters for known missiles, to select the best match to said set of estimated parameters;
    accessing parameter reference information sets relating to the mass flow rate, thrust, specific impulse, gravity-free burn-out velocity, burn-out-time, and mass at burn-out parameters of that missile which is the best match; and
    using kinematic modeling, said sensed position and velocity, and said parameter reference information set of said best match, determining the future location of said missile.

5. A method according to claim 3, further comprising the step of taking countermeasures to said missile.

* * * * *